(12) United States Patent
Acker et al.

(10) Patent No.: US 6,991,865 B2
(45) Date of Patent: Jan. 31, 2006

(54) APPARATUS AND METHODS FOR SENSOR-LESS OPTIMIZATION OF METHANOL CONCENTRATION IN A DIRECT METHANOL FUEL CELL SYSTEM

(75) Inventors: William P. Acker, Rexford, NY (US); Michael S. Adler, Niskayuna, NY (US); Shimshon Gottesfeld, Niskayuna, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 33 days.

(21) Appl. No.: 10/970,396

(22) Filed: Oct. 21, 2004

(65) Prior Publication Data

US 2005/0053811 A1    Mar. 10, 2005

Related U.S. Application Data

(60) Division of application No. 10/040,502, filed on Nov. 9, 2001, now Pat. No. 6,824,899, which is a continuation-in-part of application No. 09/721,290, filed on Nov. 22, 2000, now Pat. No. 6,589,679.

(51) Int. Cl.
    *H01M 8/04* (2006.01)

(52) U.S. Cl. .......................... 429/22; 429/23; 429/19; 429/30; 429/33; 429/34; 429/25

(58) Field of Classification Search ............. 429/22, 429/23, 19, 30, 33, 34, 25
    See application file for complete search history.

(56) References Cited

U.S. PATENT DOCUMENTS

| | | |
|---|---|---|
| 4,046,956 A | 9/1977 | Fanciullo |
| 4,593,534 A | 6/1986 | Bloomfield |
| 4,810,597 A | 3/1989 | Kumagai et al. |
| 4,904,548 A | 2/1990 | Tajima |
| 5,460,896 A | 10/1995 | Takada et al. |
| 5,925,476 A | 7/1999 | Kawatsu |
| 6,232,010 B1 | 5/2001 | Cisar et al. |
| 6,265,093 B1 | 7/2001 | Surampudi et al. |
| 6,296,964 B1 | 10/2001 | Ren et al. |
| 6,322,917 B1 | 11/2001 | Acker |
| 6,350,540 B1 | 2/2002 | Sugita et al. |
| 6,410,180 B1 | 6/2002 | Cisar et al. |
| 6,420,059 B1 | 7/2002 | Surampudi et al. |
| 6,488,837 B1 * | 12/2002 | Ren et al. .................. 205/787 |

(Continued)

FOREIGN PATENT DOCUMENTS

EP    0828303 A2    11/1998

(Continued)

OTHER PUBLICATIONS

Narayanan, et al. "Electrochemical Characteristics of Carbon-Supported Pt, Pt—Sn, Pt—Ru Electrodes for the Oxidation of Methanol and Formaldehyde", From Fuel Cell Program and Abstracts, 1992 Fuel Cell Seminar, pp. 233-236 and 461-464, no month available.

(Continued)

*Primary Examiner*—Bruce F. Bell
(74) *Attorney, Agent, or Firm*—Cesari and McKenna LLP

(57) ABSTRACT

Apparatus and methods for regulating methanol concentration in a direct methanol fuel cell system without the need for a methanol concentration sensor. One or more operating characteristics of the fuel cell, such as the potential across the load, open circuit potential, potential at the anode proximate to the end of the fuel flow path or short circuit current of the fuel cell, are used to actively control the methanol concentration.

3 Claims, 9 Drawing Sheets

U.S. PATENT DOCUMENTS

| | | | |
|---|---|---|---|
| 6,686,081 B2 * | 2/2004 | Gottesfeld | 429/30 |
| 6,761,988 B1 * | 7/2004 | Acker et al. | 429/23 |
| 2002/0155341 A1 | 10/2002 | Finkelshtain et al. | |

FOREIGN PATENT DOCUMENTS

| | | |
|---|---|---|
| GB | 1210958 | 11/1970 |
| SU | 1610522 A1 | 11/1990 |
| WO | WO 97/50140 | 12/1997 |
| WO | WO 00/02282 | 1/2000 |
| WO | WO 01/03220 A1 | 1/2001 |

OTHER PUBLICATIONS

Ren, Xiaoming et al. Methanol Cross-Over in Direct Methanol Fuel Cells, Electronic and Electrochemical Materials and Devices, MST-11, MS-D429, Los Alamos National Laboratory, NM, pp. 284-293, Oct. 1995.

Maynard, et al., Miniaturized Fuel Cells for Portable Power, Presented at Conference on Small Fuel Cells and Battery Technologies 2000. New Orleans, LA. All pages. Apr. 27-28, 2000.

Sharke, Paul. Pocket-Size PEMs, http://www.memagazine.org/contents/current/features/pems/pems.html, Jul. 25, 2000, all pages.

Gottesfeld, et al. "Polymer Electrolyte Fuel Cell as Potential Power Sources for Portable Electronic Devices" from Energy Storage Systems in Electronics, 2000, pp. 487-517, Gordon & Breach Science Pub; ISBN: 90-5699-176-0, no month available.

International Search Report for International Application No. : PCT/US01/42960 for Apparatus and Methods for Sensor-Less Optimization of a Methanol Concentration in a Direct Methanol Fuel Cell System. Date of Completion of the International Search: Aug. 7, 2003.

* cited by examiner

APPARATUS AND METHODS FOR SENSOR-LESS OPTIMIZATION OF METHANOL CONCENTRATION IN A DIRECT METHANOL FUEL CELL SYSTEM

CROSS-REFERENCE TO RELATED APPLICATIONS

The present application is a divisional of commonly assigned U.S. patent application Ser. No. 10/040,502, which was filed on Nov. 9, 2001 now U.S. Pat. No. 6,824,899, by William P. Acker, et al., for Apparatus and Methods for Sensor-less Optimization of Methanol Concentration in a Direct Methanol Fuel Cell System, and is hereby incorporated by reference, which application is a continuation-in-part of commonly-assigned U.S. patent application Ser. No. 09/721,290, now U.S. Pat. No. 6,589,679, which was filed on Nov. 22, 2000, by William P. Acker, et al., for Apparatus and Methods for Sensor-less Optimization of Methanol Concentration in a Direct Methanol Fuel Cell System and is hereby incorporated by reference.

BACKGROUND OF THE INVENTION

1. Field of the Invention

The present invention relates generally to the field of fuel cells and, more specifically, to a direct methanol fuel cell system in which active control of the concentration of methanol at a critical point within the cell allows dynamic response to changes in power demand while minimizing crossover of methanol through the cell's membrane.

2. Background Information

Fuel cells are devices in which an electrochemical reaction is used to generate electricity. A variety of materials may be suitable for use as a fuel, depending upon the materials chosen for the components of the cell. Organic materials, such as methanol or formaldehyde, are attractive choices for fuels due to their high specific energies.

Fuel cell systems may be divided into "reformer based" (i.e., those in which the fuel is processed in some fashion before it is introduced into the cell) or "direct oxidation" in which the fuel is fed directly into the cell without internal processing. Most currently available fuel cells are of the reformer-based type, and their fuel processing requirement limits their application to relatively large applications relative to direct oxidation systems.

An example of a direct oxidation system is the direct methanol fuel cell system or DMFC. In a DMFC, the electrochemical reaction at the anode is a conversion of methanol and water to $CO_2$, $H^+$ and $e^-$. The hydrogen ions flow through a membrane electrolyte to the cathode, while the free electrons flow through a load which is normally connected between the anode and cathode. At the cathode, oxygen reacts with hydrogen ions and free electrons to form water.

In addition, conventional DMFCs suffer from a problem which is well known to those skilled in the art: cross-over of methanol from the anode to the cathode through the membrane electrolyte, which causes significant loss in efficiency. Cross-over occurs because of the high solubility of methanol in the membrane electrolyte. In order to minimize cross-over, and thereby minimize the loss of efficiency, the concentration of methanol in the fuel feed stream is kept low (e.g., below 1M) by dilution with water. However, dilution of the methanol introduces other disadvantages: (1) the fuel cell's construction becomes more complicated and costly because of the structures and processes needed to store and manage the water; and (2) the energy per unit volume of the fuel cell, which is a critical factor in terms of the fuel cell's potential commercial applications, is reduced.

Many important applications of DMFCs require that the power source be able to vary its output in response to constantly changing electrical loads. There is a direct relationship between the electric load and the amount of methanol consumed. As such, it is desirable to vary the amount of methanol that is fed into the fuel cell, to supply slightly more fuel to the fuel cell than is consumed by the reaction that generates electricity. However, supplying substantially more fuel than is required has several disadvantages: it increases methanol crossover, which decreases efficiency of the system; in an open anode configuration, it increases the amount of fuel that passes through without reacting, thus wasting fuel; and in a closed anode configuration, it increases the volume of unreacted fuel that must be recirculated, consuming energy and increasing the demands on the system.

It is known to those skilled in the art that conventional efforts to actively control the methanol concentration, for the purposes of regulating the power output of a DMFC system and minimizing cross-over, have been accompanied by another disadvantage. In order to effect control using conventional methods, a methanol concentration sensor must be provided, the presence of which tends to further increase the cost and complexity of the fuel cell system as well as introduce an additional component whose failure could significantly affect performance.

SUMMARY OF THE INVENTION

The present invention provides a direct methanol fuel cell system in which the concentration of methanol supplied to the anode is actively controlled so as to optimize the performance of the system, and minimize cross-over, but without the need for a methanol concentration sensor. The present invention monitors one or more of the fuel cell's operating characteristics, such as the potential across the load, the open circuit potential or the short circuit current. A preferable choice of operating characteristic is one for which a known relationship exists between that characteristic and methanol concentration. In this fashion, the monitored characteristic may be used, directly or indirectly, to generate a control signal which is supplied to a regulator. The regulator, which is coupled to sources of methanol and water and responsive to the control signal, functions to increase or decrease the concentration of methanol supplied to the anode.

In a first embodiment, the potential across the load or fuel cell stack is detected. Periodically, the flow of methanol is reduced or interrupted. As the methanol concentration drops, the potential across the load drops. By measuring the time required for the potential to drop to a predetermined value or the rate at which the potential drops, an initial methanol concentration may be determined and used to calculate or retrieve from a memory, appropriate values for adjusting the concentration.

In a second embodiment, the potential is detected at a portion of the anode which is proximate to the end of the methanol flow path. Because the methanol concentration is normally lowest at the end of the flow path, the proximate portion of the anode is highly sensitive to changes in methanol concentration. The detected potential is compared to a predetermined reference or to the potential at another point of the anode which is upstream in the flow path, the difference being used to adjust the concentration.

In a third embodiment, the load is periodically disconnected from the fuel cell, thereby creating brief periods of time in which the open circuit potential of the fuel cell is detected. The detected potential is stored and compared to a previously stored value which represents the detected potential at an earlier time or a predetermined reference. Because the fuel cell's open circuit potential decreases as a result of methanol cross-over, the difference in the compared potentials may be used to adjust the methanol concentration.

In a fourth embodiment, the load is periodically short-circuited, thereby creating brief periods of time in which the short circuit current of the fuel cell is detected and stored. Because all of the current produced by the fuel cell passes through the short circuit, the stored value serves as an indicator of how much methanol is available to the anode at a given time. The stored value is compared to a reference and the difference used to adjust the methanol concentration.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
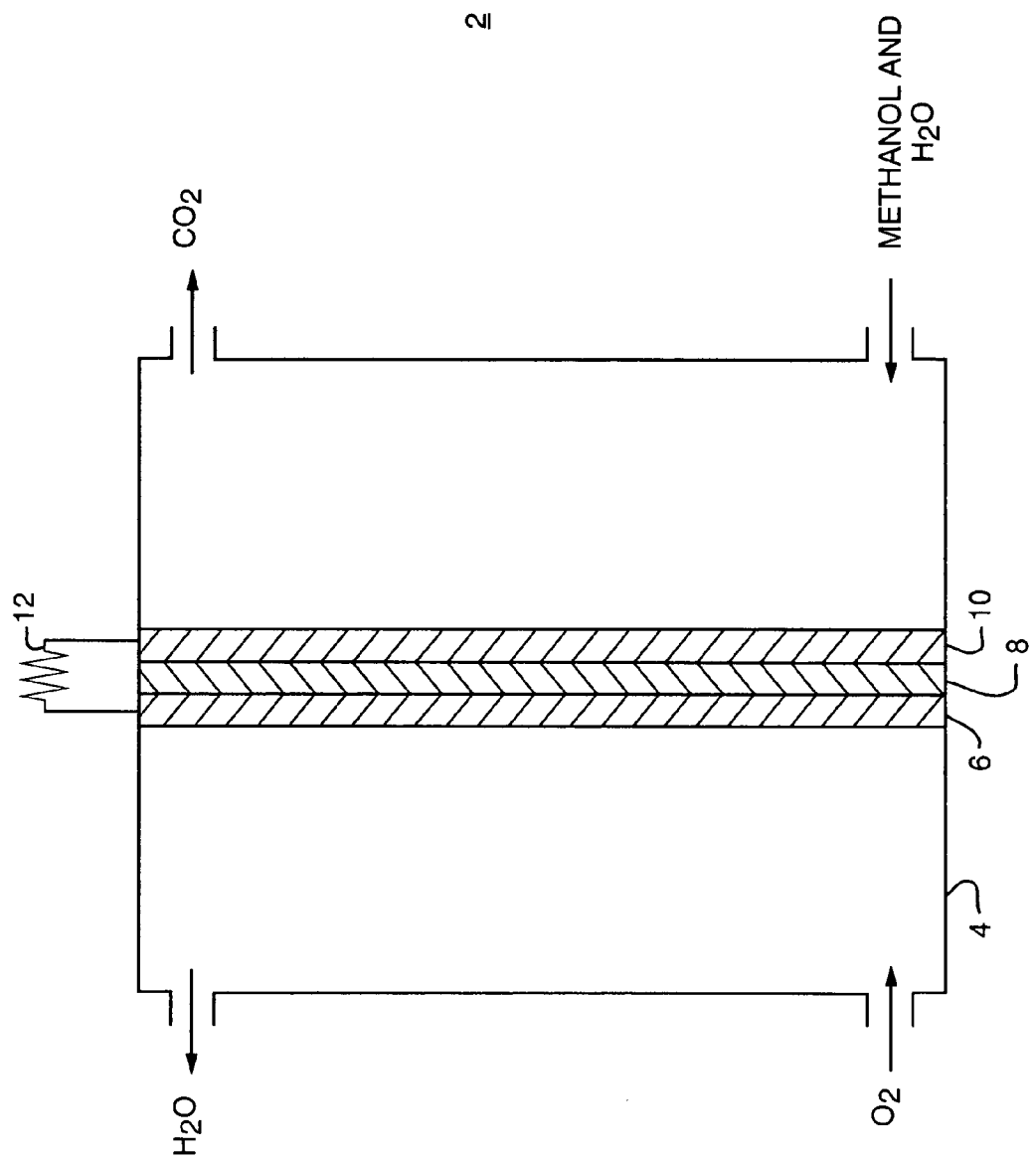
FIG. 1 is a block diagram of a direct methanol fuel cell known in the prior art.

FIG. 1 shows a conventional direct methanol fuel cell 2 in which a housing 4 encloses a cathode 6, a membrane electrolyte 8 and an anode 10. A load 12 is connected across cathode 6 and anode 10. Methanol and water are introduced into the anode side of housing 4 while oxygen is introduced into the cathode side of the housing. The source of the oxygen is preferably ambient air, but it should be understood that other sources could be used. As a result of the reactions at the anode and cathode, free electrons flow from anode 10 through load 12 to cathode 6, while hydrogen ions flow from anode 10 through membrane 8 to cathode 6. So long as the reactions continue, a current is maintained through load 12.

Figure 2:
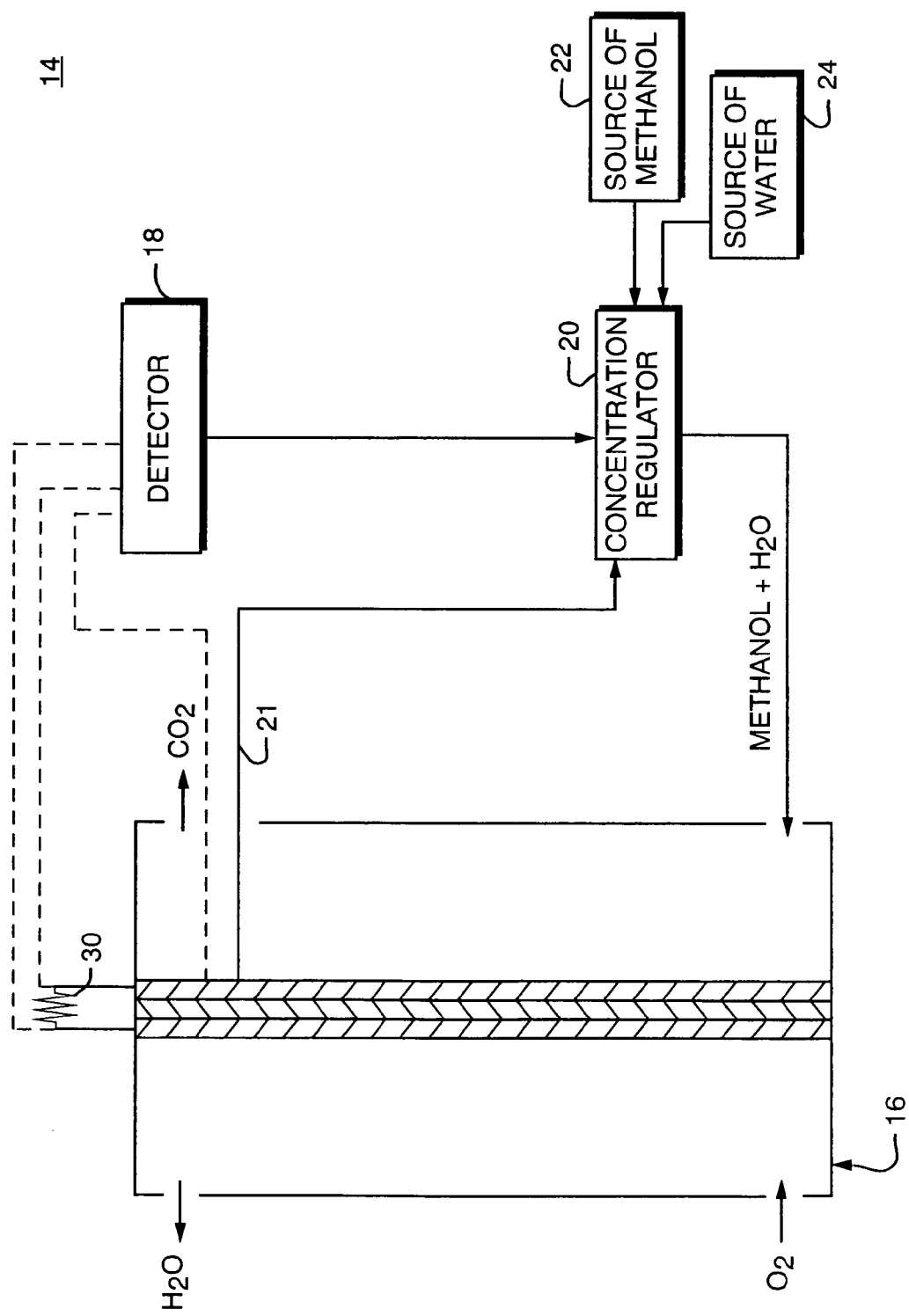
FIG. 2 is a block diagram of a direct methanol fuel cell system constructed in accordance with a preferred embodiment of the present invention.

FIG. 2 shows a direct methanol fuel cell system 14 which includes a direct methanol fuel cell 16, like that shown in FIG. 1, which provides electricity to a load 30. System 14 also includes a detector 18, a concentration regulator 20, a source of methanol 22 and a source of water 24, which may represent water generated on the cathode side, water from an internal source, or a combination of both. Detector 18 is coupled across load 30 or to one or more points in the interior of fuel cell 16 and, as described in detail below, functions to measure one or more operating characteristics that are either directly or indirectly indicative of the concentration of methanol within fuel cell 16. Detector 18 generates a control signal which is supplied to concentration regulator 20. Concentration regulator 20, via flow path 21, receives unreacted methanol and water from fuel cell 16. In response to the control signal, regulator 20 operates to adjust the concentration of methanol supplied to fuel cell 16.

Regulator 20 may be implemented using a metering valve, a pump, a combination of a valve and pump, or any of a number of other conventional devices which are capable of controlling a flow of liquid and compatible with the control signal generated by detector 18. It should be understood that while concentration regulator 20 is shown coupled to both sources 22 and 24, it is of course possible to control the concentration of methanol delivered to fuel cell 16 by regulating either the flow of methanol or water or both. Alternatively, the outputs of sources 22 and 24 may be coupled to flow path 21 and such outputs controlled directly by the control signal generated by detector 18, in which case concentration regulator 20 would not be needed.

Figure 3:
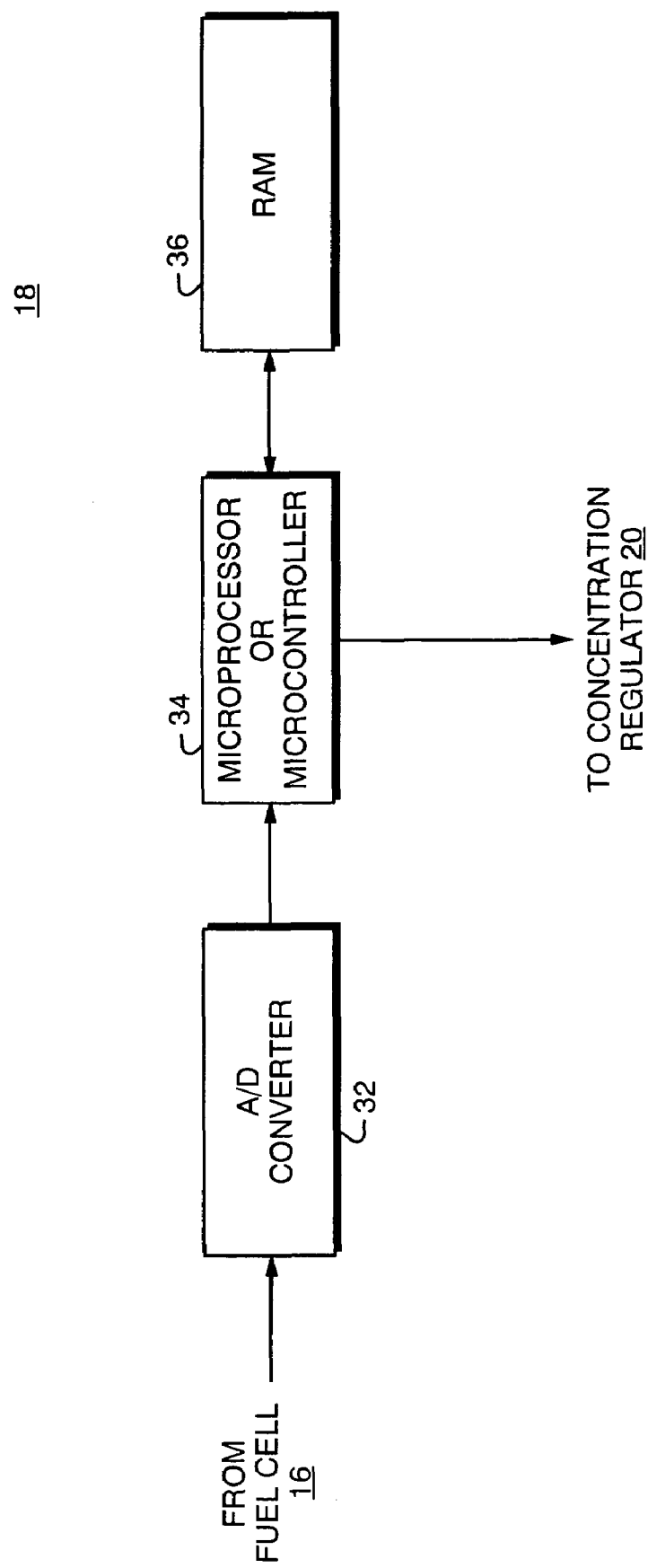
FIG. 3 is a block diagram of one embodiment of the sensor/detector shown in FIG. 2.

FIG. 3 shows one embodiment of detector 18. An analog to digital (A/D) converter 32 is connected to receive an analog signal (e.g., a potential) from fuel cell 16. Converter 32 produces a digital output signal which is supplied to a microprocessor or microcontroller 34. Microprocessor 34 is connected to a random access memory (RAM) 36. Microprocessor 34 may also be connected to a read only memory (ROM) (not shown) or other ancillary circuitry depending upon the requirements of a particular application. By loading RAM 36 with appropriate instructions and data, microprocessor 34 may be programmed in a well known manner to adjust the methanol concentration using one or more of the methods described below in connection with FIGS. 4–6.

It should be understood that a wide variety of other circuits or devices could be used for detector 18 depending upon which operating characteristic of the fuel cell 16 is of interest. For example, the combination of a half-wave rectifier and a comparator could be used to monitor a potential produced by the fuel cell 16, compare the potential to a reference, and use the difference as a control signal for methanol regulator 20.

Figure 4:
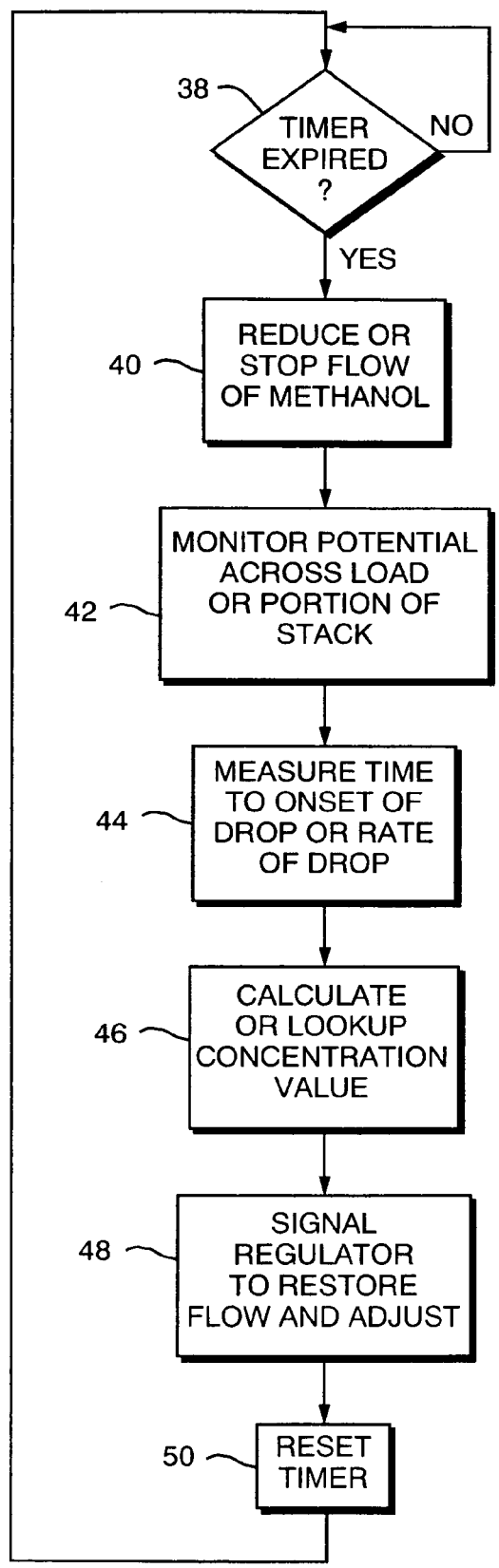
FIG. 4 is a flowchart of a first method of controlling methanol concentration in the fuel cell system of FIG. 2.

With reference now to FIGS. 3 and 4, a first method for regulating methanol concentration is shown. At step 38, a timer is tested to determine whether time has expired. If the time has not expired, the process essentially waits. If the time has expired, which indicates that it is time for a possible methanol concentration adjustment, the process advances to step 40 where microprocessor 34, through its control signal to regulator 20, causes the flow of methanol to be reduced or interrupted. Next, at step 42, the potential across load 30 (FIG. 2) or, if desired, some portion of the fuel cell stack is monitored and converted by A/D converter 32.

The potential across the load exhibits a non-linear relationship with methanol concentration in which the potential decreases gradually as the concentration decreases over a certain range, followed by a rapid decrease as the concentration falls below a level needed to sustain an efficient reaction. At step 44, microprocessor 34 may measure the elapsed time between the interruption of methanol flow and the decrease of potential across the load or the rate of decrease of that potential. Next, at step 46, microprocessor 34 may either calculate or retrieve from a database or other data structure that may be stored in RAM 36 a value to supply as the control signal to the concentration regulator. At step 48, microprocessor 34 signals regulator 20 to restore and adjust the flow of methanol or water to optimize the methanol concentration. Lastly, at step 50, the timer is reset and the process returns to begin again.

Figure 5:
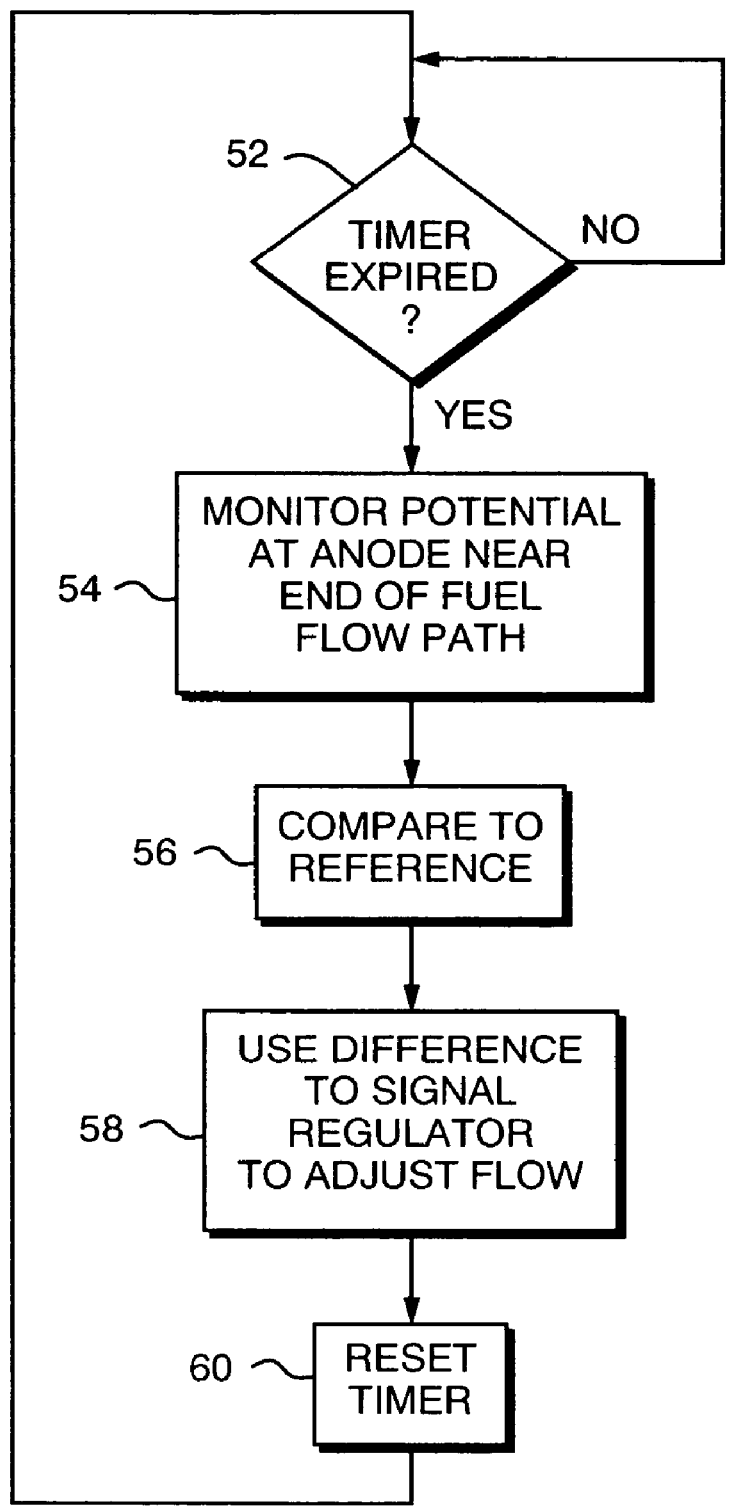
FIG. 5 is a flowchart of a second method of controlling methanol concentration in the fuel cell system of FIG. 2.

FIG. 5 shows an alternative method for effecting methanol concentration control. Again, the process begins, at step 52, with a determination whether predetermined time period has expired. If so, the process proceeds to step 54 where the potential is monitored at an electrically isolated portion of the anode of the fuel cell that is proximate to the end of the methanol/water flow path (i.e., the farthest point from where methanol/water mixture enters the fuel cell housing), and compared to a predetermined value or the potential across another portion of the fuel cell. That point is preferably chosen because the methanol concentration is normally lowest there and the proximate portion of the anode is therefore very sensitive to changes in concentration.

At step 56, the potential is compared to a reference (e.g., a predetermined value stored in RAM 36 or possibly an earlier value of the monitored potential that was previously stored) and the difference, if any, is then used to signal regulator 20 to adjust the flow of methanol or water at step 58. At step 60, the timer is reset and the process begins again.

Figure 6:
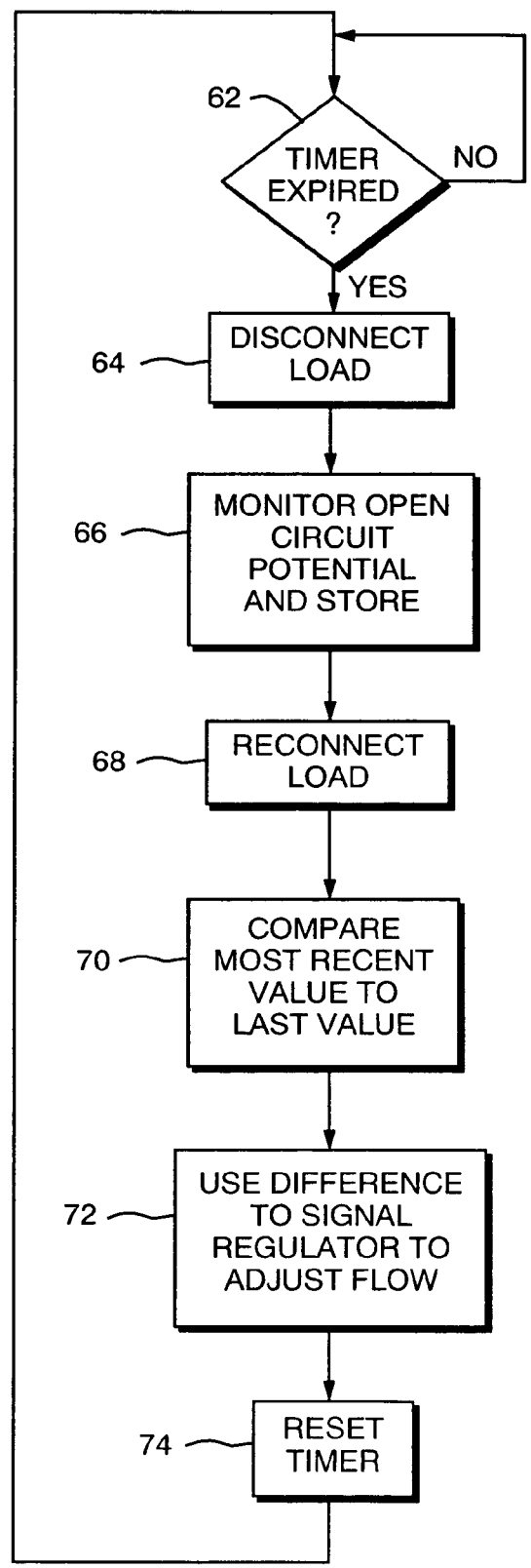
FIG. 6 is a flowchart of a third method of controlling methanol concentration in the fuel cell system of FIG. 2.

FIG. 6 shows another alternative method for controlling methanol concentration. In this method, following the expiration of a time at step 62, the load is temporarily disconnected from the fuel cell 16. This may be accomplished by a microswitch or similar device (not shown) that is controlled by microprocessor 34. Next, at step 66, the open circuit potential of fuel cell 16 is monitored and stored. The open circuit potential of the fuel cell is of interest because that potential decreases as methanol cross-over occurs.

At step 68, the load is reconnected to the fuel cell 16. At step 70, the most recent value of the open circuit potential is compared to a previously stored value (or to a predetermined reference) and the difference, if any, is again used to signal methanol regulator 20 to adjust the flow of methanol or water as appropriate at step 72. At step 74, the timer is reset and the process begins again.

Figure 7:
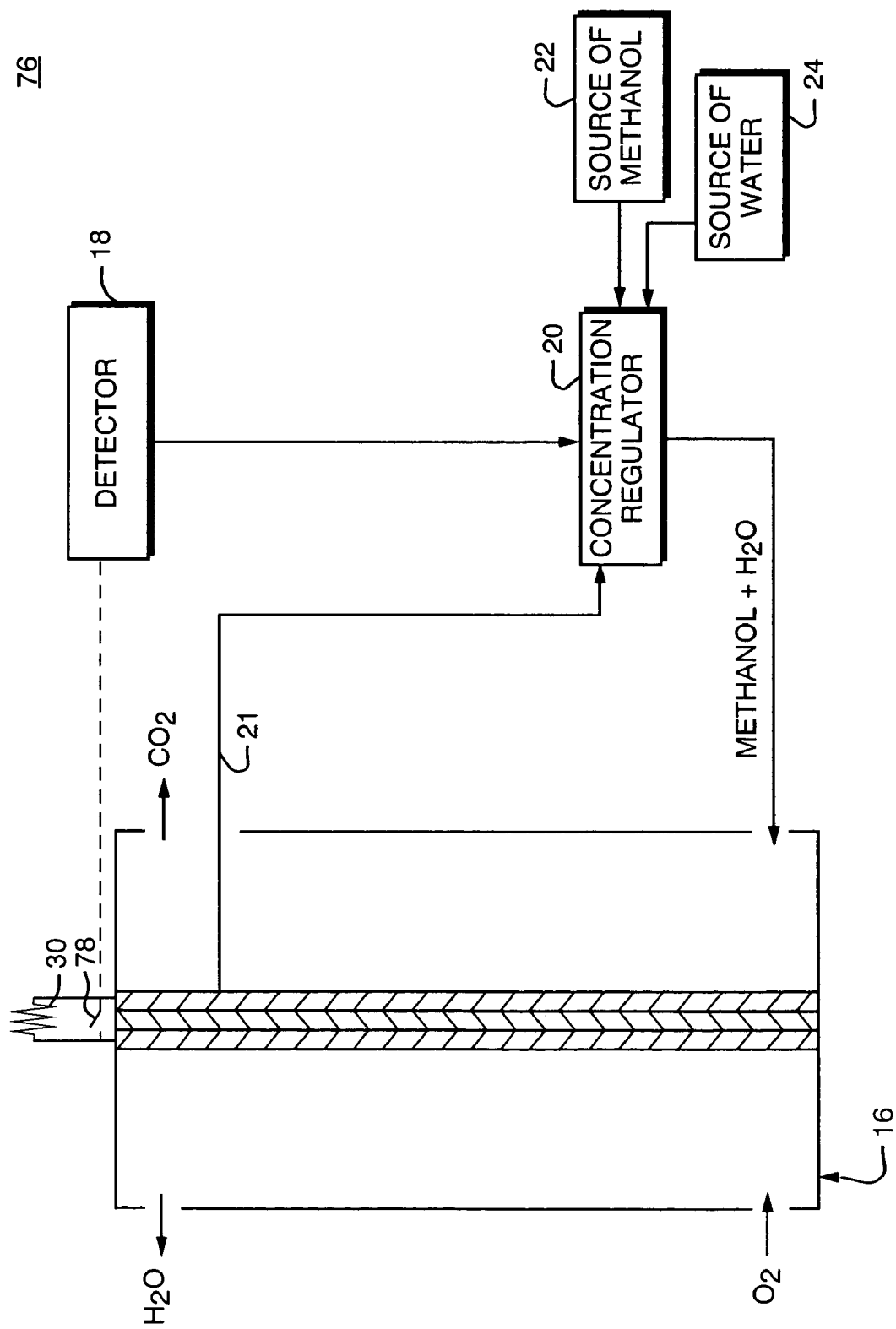
FIG. 7 is a block diagram of a direct methanol fuel cell system constructed in accordance with an alternative embodiment of the present invention.
Figure 8:
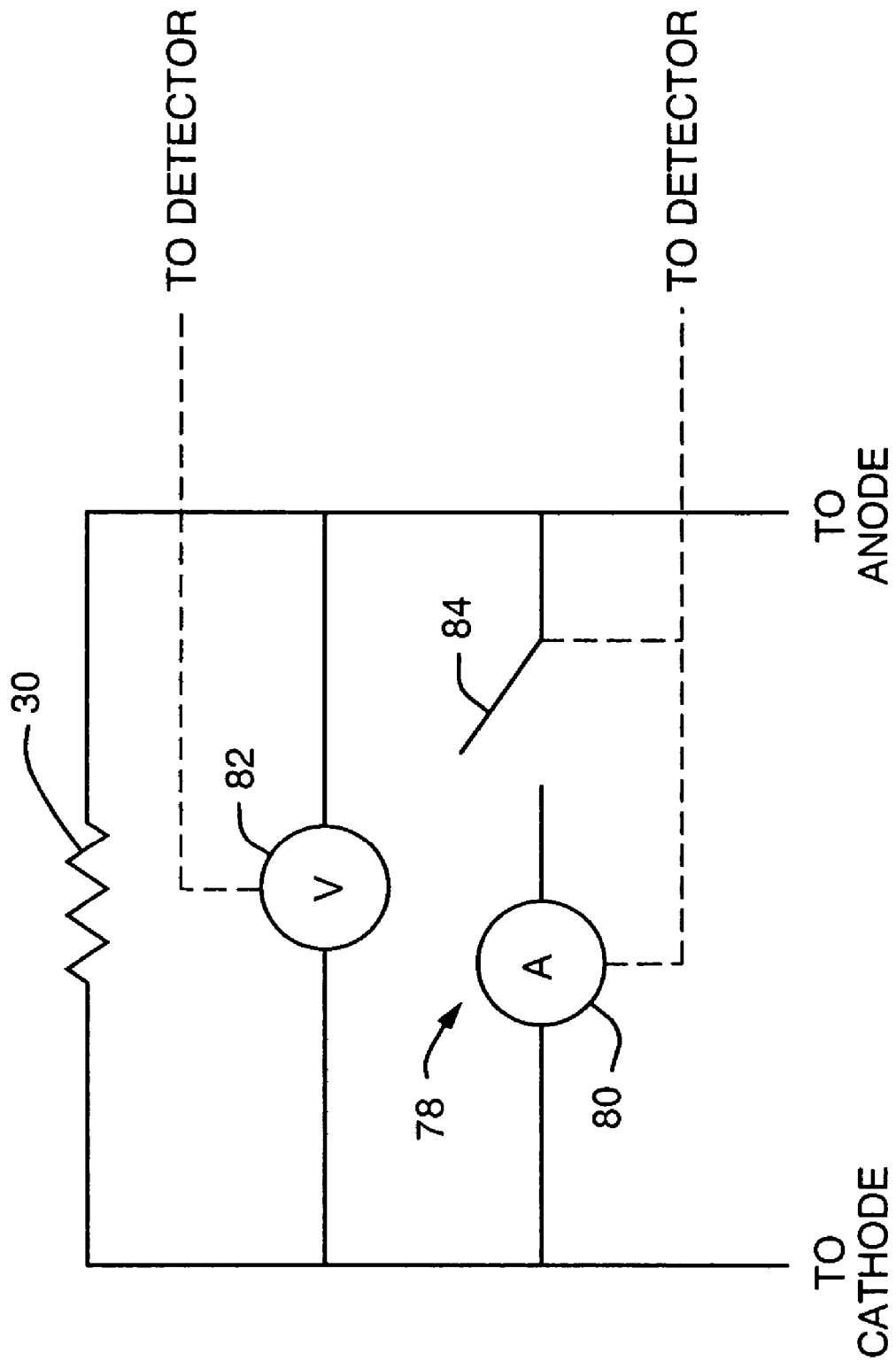
FIG. 8 is a schematic diagram of the switch shown in FIG. 7.

FIGS. 7 and 8 show another alternative embodiment of the present invention in which a direct methanol fuel cell system 76 includes a circuit 78 for periodically short-circuiting load 30. A current measuring device 80 is connected in series with a switch 84, both of which are coupled to detector 18. When switch 84 is open, essentially all of the current generated by fuel cell 16 flows through load 30 in a normal fashion. Conversely, when switch 84 is closed, essentially all of the current generated by fuel cell 16 flows through current measuring device 80. An optional potential measuring device 82 is connected in parallel with load 30.

Figure 9:
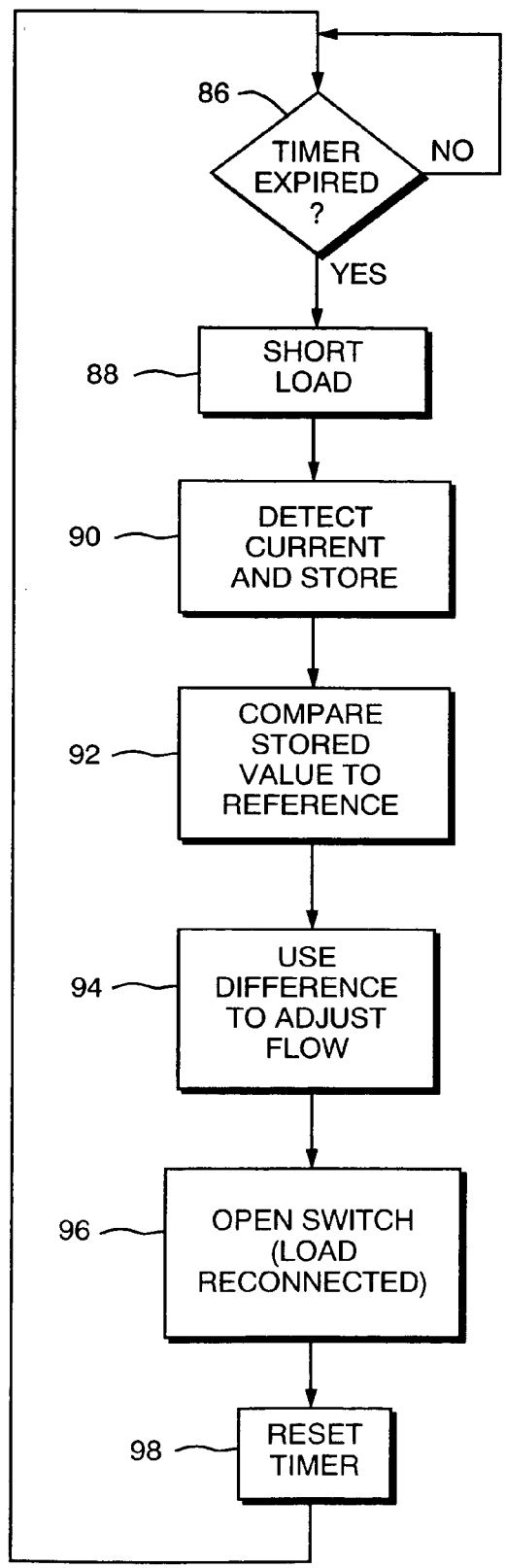
FIG. 9 is a flowchart of a method of controlling methanol concentration in the fuel cell system of FIG. 7.

With reference now to FIGS. 8 and 9, an alternative method for controlling methanol concentration will be described. Following the expiration of a timer at step 86, switch 84 is closed thereby short-circuiting load 30. Device 80 measures the current flowing through the short circuit and generates a signal or value indicative of same which is stored by detector 18 at step 90. The short-circuit current is an indicator of how much methanol is available to the anode of fuel cell 16 and is thus useful in controlling methanol concentration.

Next, at step 92, the stored value is compared to a reference and, at step 94, the difference is used to adjust the flow of methanol as described above. At step 96, switch 84 is opened, effectively reconnecting load 30 to fuel cell 16. At step 98, the timer is reset and the process begins to repeat.

In accordance with yet another embodiment of the present invention, two or more of the foregoing methods may be combined. For example, using the circuit of FIG. 8 including device 82, the methods of FIG. 4 (using potential across load or a portion of the fuel cell stack) and FIG. 9 (short circuit current) could be used together to control methanol concentration. Such combinations could provide redundancy or make possible more precise control of methanol concentration.

It should be understood that other operating characteristics of the fuel cell which have known or derivable relationships to methanol concentration may also be used with the present invention.

What is claimed is:

1. A direct methanol fuel cell system comprising;
   a direct methanol fuel cell;
   a source of air or oxygen coupled to the fuel cell;
   a source of methanol;
   a source of water;
   a detector for detecting changes in a short circuit current produced by said fuel cell and responsively producing a control signal; and
   a concentration regulator coupled to the methanol source or to the water source or to both sources and said detector, said concentration regulator being responsive to said control signal for varying the concentration of methanol in said fuel cell.

2. A direct methanol fuel cell system comprising;
   a direct methanol fuel cell;
   a source of air or oxygen coupled to the fuel cell;
   a source of methanol;
   a source of water;
   a detector for detecting changes in a short circuit current produced by said fuel cell and responsively producing a control signal; and
   a concentration regulator coupled to the methanol source or to the water source or to both sources, detector and anode of said fuel cell, responsive to said control signal for varying the concentration of methanol in said fuel cell, and wherein said concentration regulator comprises a metering valve, a pump, or a combination thereof.

3. The direct methanol fuel cell system as defined in claim 1, wherein said detector has associated therewith a current measuring device and an associated switch for obtaining said short circuit current.

\* \* \* \* \*